(12) United States Patent
Long et al.

(10) Patent No.: US 7,651,819 B2
(45) Date of Patent: *Jan. 26, 2010

(54) COMPOSITE ELECTRODE STRUCTURE WITH AN ULTRATHIN CONFORMAL POLYMER COATING

(75) Inventors: Jeffrey W. Long, Alexandria, VA (US); Debra R. Rolison, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/589,729

(22) Filed: Oct. 31, 2006

(65) Prior Publication Data

US 2007/0048614 A1 Mar. 1, 2007

Related U.S. Application Data

(62) Division of application No. 10/601,881, filed on Jun. 24, 2003, now Pat. No. 7,144,658.

(51) Int. Cl.
*H01M 4/00* (2006.01)
*H01M 4/60* (2006.01)
*H01M 4/66* (2006.01)
*B05D 5/12* (2006.01)
*C23C 28/00* (2006.01)

(52) U.S. Cl. ............... 429/245; 429/223; 429/213; 427/126.3; 427/126.6; 427/58; 205/189; 205/317

(58) Field of Classification Search ............... 429/223, 429/245, 213; 427/126, 58; 205/189, 317
See application file for complete search history.

(56) References Cited

U.S. PATENT DOCUMENTS 5,282,955 A * 2/1994 Leventis et al. ............ 205/317
2003/0108785 A1* 6/2003 Wu et al. ..................... 429/44

* cited by examiner

*Primary Examiner*—Patrick Ryan
*Assistant Examiner*—Karie O'Neill
(74) *Attorney, Agent, or Firm*—John J. Karasek; Stephen T. Hunnius

(57) ABSTRACT

A device for use in energy storage comprising a nanostructured mesoporous electrically conductive substrate coated with a metal oxide and an ultrathin conformal polymer coating on the metal oxide wherein said electrode has a mesoporous structure. Also disclosed is the related method for making an electrode for use in energy storage.

16 Claims, 3 Drawing Sheets

COMPOSITE ELECTRODE STRUCTURE WITH AN ULTRATHIN CONFORMAL POLYMER COATING

This is a divisional application of application Ser. No. 10/601,881 filed on Jun. 24, 2003 now U.S. Pat. No. 7,144,658, the entire contents of which are herein incorporated by reference.

BACKGROUND

The present invention relates to energy storage, such as in ultracapacitors and solid-state batteries, and, more specifically, to energy storage with power sources that use acidic electrolytes.

Aerogels (and related ambigels) are sol-gel-derived nanoarchitectures composed of a three-dimensional network of nanoscale particles intermingled with a continuous, aperiodic mesoporosity. The architectural characteristics of high surface area and continuous porosity enhance the transport of ions and molecules throughout the pore-solid architecture for interaction with the nanoscopic solid domains. This combination of properties, which are intrinsic to electrically conductive aerogels, makes them attractive candidates as electrode materials for energy-storage devices including batteries and ultracapacitors. Aerogels and ambigels based on metal oxides, such as manganese oxide ($MnO_2$), are particularly relevant for charge storage, as such oxides undergo reversible cation-electron insertion reactions. Nanostructured metal oxide electrodes exhibit superior performance when used as lithium-battery electrodes or ultracapacitors. See D. R. Rolison & B. Dunn, *J. Mater. Chem.*, 11, 963 (2002), incorporated herein by reference.

Ultracapacitors are a class of energy-storage materials that offer significant promise in bridging the performance gap between the high energy density of batteries and the high power density derived from dielectric capacitors. Currently, high-performance ultracapacitors are based on nanoscale forms of mixed ion-electron conducting metal oxides, such as $RuO_2$, which store charge via a cation-electron insertion mechanism.

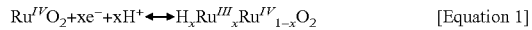

$$Ru^{IV}O_2 + xe^- + xH^+ \longleftrightarrow H_xRu^{III}_xRu^{IV}_{1-x}O_2 \quad [\text{Equation 1}]$$

The charge/discharge profiles associated with such reactions often mimic those of capacitors with a constant charge released or stored over a broad potential range, and thus this type of charge storage is often designated as pseudocapacitance. Ultracapacitors based on hydrous $RuO_2$ yield specific capacitances as high as 768 F/g. The application of $RuO_2$ is limited however by its high cost as a platinum-group metal and its non-domestic sources.

The abundance of manganese minerals and the low toxicity of manganese precursors make $MnO_2$ both an economical and an environmentally benign alternative to $RuO_2$. Manganese oxides are well-studied materials for use as insertion electrodes, with applications ranging from alkaline $Zn/MnO_2$ cells (equation 2) to lithium-ion batteries (equation 3).

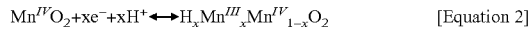

$$Mn^{IV}O_2 + xe^- + xH^+ \longleftrightarrow H_xMn^{III}_xMn^{IV}_{1-x}O_2 \quad [\text{Equation 2}]$$

$$Mn^{IV}O_2 + xe^- + xLi^+ \longleftrightarrow Li_xMn^{III}_xMn^{IV}_{1-x}O_2 \quad [\text{Equation 3}]$$

Manganese oxides may also be synthesized in a wide range of polymorphs, each with characteristic electrochemical properties. Manganese oxides have been investigated as ultracapacitor electrodes in neutral aqueous electrolytes. Specific capacitance values for $MnO_2$ are as high as 700 F/g for thin-film electrodes, although practical $MnO_2$ electrode configurations yield only 200 F/g. See S. C. Pang, M. A. Anderson & T. W. Chapman, *J. Electrochem. Soc.*, 147, 444 (2000); H. Y. Lee & J. B. Goodenough, *J. Solid State Chem.*, 144, 220 (1999); and J. W. Long, A. L. Young & D. R. Rolison, *Advanced Batteries and Super Capacitors*, G. Nazri, R. Koetz, B. Scrosati, P. A. Moro, E. S. Takeuchi (Eds.) PV 2001-21, Electrochemical Society (Pennington, N.J.), 2003, pp. 752-759, all of which are incorporated herein by reference.

Previous studies with hydrous $RuO_2$ have demonstrated that the maximum ultracapacitance is achieved in acidic electrolytes, where high concentrations of highly mobile protons are available to the oxide electrode. See L. D. Burke, O. J. Murphy, J. F. O'Neill & S. Venkatesan, *J. Chem. Soc., Faraday Trans.*, 73, 1659 (1977) and E. W. Tsai & K. Rajeshwar, *Electrochim. Acta*, 36, 27 (1991), both of which are incorporated herein by reference. However, manganese oxide undergoes a reductive-dissolution process when exposed to even mildly acidic electrolytes, yielding water-soluble Mn(II) species.

$$Mn^{IV}O_2 + H^+ + e^- \longleftrightarrow Mn^{III}OOH \quad [\text{Equation 4}]$$

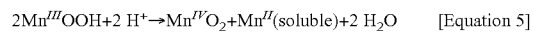

$$2Mn^{III}OOH + 2H^+ \rightarrow Mn^{IV}O_2 + Mn^{II}(\text{soluble}) + 2H_2O \quad [\text{Equation 5}]$$

Redeposition of $MnO_2$ via electro-oxidation of Mn(II) is inhibited in acid electrolytes, requiring high overpotentials and elevated temperatures to achieve significant deposition rates. The use of $MnO_2$ as an ultracapacitor, therefore, is limited to near-neutral-pH aqueous electrolytes where the pseudocapacitance is restricted by the presence of less-desirable insertion cations, such as $Li^+$ and $K^+$, which compete with $H^+$ for association at the $MnO_2$ electrode.

Conducting polymers are also being investigated as ultracapacitors because of their ability to undergo electrochemically driven ion-insertion reactions. See A. Rudge, J. Davey, I. Raistrick, S. Gottesfeld & J. P Ferraris, *J. Power Sources*, 47, 89 (1994), incorporated herein by reference. The energy density of ultracapacitors based on conducting polymers is restricted by the low mass-density of the active organic component as well as the low ion-doping levels, typically less than 0.5 electrons/ions per monomer unit. This limitation of conducting polymer ultracapacitors can be somewhat offset by pairing p-doped and n-doped polymer electrodes in nonaqueous electrolytes, where higher cell voltages (2-3 volts) can be achieved. However, these electrolytes have the further disadvantages of cost and flammability relative to aqueous acid electrolytes.

SUMMARY

We extend the versatility of electrically conductive aerogels and related structures by modifying them with insulating and conducting polymers. By choosing self-limiting electropolymerization schemes that result in conformal, ultrathin (<15-nm thick) polymer coatings we generate hybrid structures that retain the desirable properties of surface area and continuous mesoporosity inherent to the initial metal-oxide or carbon nanoarchitecture. Representative electrodeposited polymers include poly(o-phenylenediamine), PPD, and poly (o-methoxyaniline), POMA. In a preferred embodiment, the metal oxide is manganese or iron oxide. Another aspect of the present invention is a method of making a high-performance aqueous-acid ultracapacitor comprising the steps of (a) preparing a nanostructured, mesoporous metal oxide film, and (b) electrochemically depositing an ultrathin polymer coating on the metal oxide film.

The present invention has the potential to deliver high volumetric charge-storage density, particularly when compared to ultracapacitors based exclusively on conducting polymers, with economic advantages due to the much lower costs of manganese and iron oxides relative to current high-performance ultracapacitors based on ruthenium oxides.

The present invention serves as the platform for an all-solid-state, three-dimensionally constructed battery where the metal oxide functions as the battery cathode and the insulating polymer coating functions as the separator/electrolyte. Battery fabrication will be completed by filling the remaining pore volume of the polymer-metal-oxide hybrid structure with an appropriate anode material, such as metallic lithium.

BRIEF DESCRIPTION OF THE DRAWINGS

These and other objects, features and advantages of the invention, as well as the invention itself, will become better understood by reference to the following detailed description, appended claims, and accompanying drawings where:

DESCRIPTION

Nanostructured conducting-polymer-metal-oxide hybrids are designed as high-energy-density ultracapacitors as well as platforms for all-solid-state, three-dimensionally designed batteries. In the first case, the polymer components of these hybrids stabilize normally unstable oxides, such as $MnO_2$, $Fe_2O_3$, and FeOOH, against corrosion in aqueous-acid electrolytes. The polymer also serves as an active proton conductor, supplying charge-compensating protons from the external electrolyte to the encapsulated metal oxide domains. The high mass-density and faradaic capacity of the metal oxide provide high energy density in the resulting hybrids. The success of these hybrids as ultracapacitors relies on the ability to reversibly access the available oxidation states of the oxide component: Mn(IV) ↔Mn(III) ↔Mn(II) for $MnO_2$; and Fe(III) ↔Fe(II) ↔for $Fe_2O_3$ or FeOOH. Polymer-coated, nanostructured oxides can be used as the active components in low-cost, high-performance aqueous-acid ultracapacitors.

Metal oxides that can be used in the present invention include, but are not limited to, manganese, iron, vanadium, and nickel oxides, or mixtures of these oxides (either physical or intimate chemical mixtures). In a preferred embodiment, manganese oxides are used. Nanostructured highly porous architectures of manganese oxides can be synthesized as aerogels, ambigels, and xerogels. See J. W. Long, K. E. Swider-Lyons, R. M. Stroud & D. R. Rolison, *Electrochem. Solid-State Lett.*, 3, 453 (2000); and J. W. Long, R. M. Stroud & D. R. Rolison, *J. Non-Cryst. Solids*, 285, 288 (2001), all of which are incorporated herein by reference. Nanostructured, mesoporous $MnO_2$ films are prepared as described in J. W. Long, L. R. Qadir, R. M. Stroud & D. R. Rolison, *J. Phys. Chem. B*, 105, 8712 (2001), incorporated herein by reference.

In a preferred embodiment, the polymer component is based on an arylamine monomer, such as o-phenylenediamine or aniline. The polymer serves as a physical barrier to an external aqueous acidic electrolyte, specifically the $H_2O$ and hydrated protons therein, while providing for transport of charge-compensating unsolvated protons to the underlying metal oxide via an electrochemical gating mechanism. See P. Burgmayer and R. W. Murray, *J. Am. Chem. Soc.*, 104, 6139 (1982), incorporated herein by reference. A protective, proton-conductive polymer film is prepared on the $MnO_2$ electrode by the electrochemically initiated polymerization of o-phenylenediamine (OPD). Established methods can be used for the oxidative electropolymerization of OPD. See H. S. White, H. D. Abruña & A. J. Bard, *J. Electrochem. Soc.*, 129, 265 (1982) and A. M. Yacynych & H. B. Mark, Jr., *J. Electrochem. Soc.*, 123, 1346 (1976), both of which are incorporated herein by reference.

Figure 1:
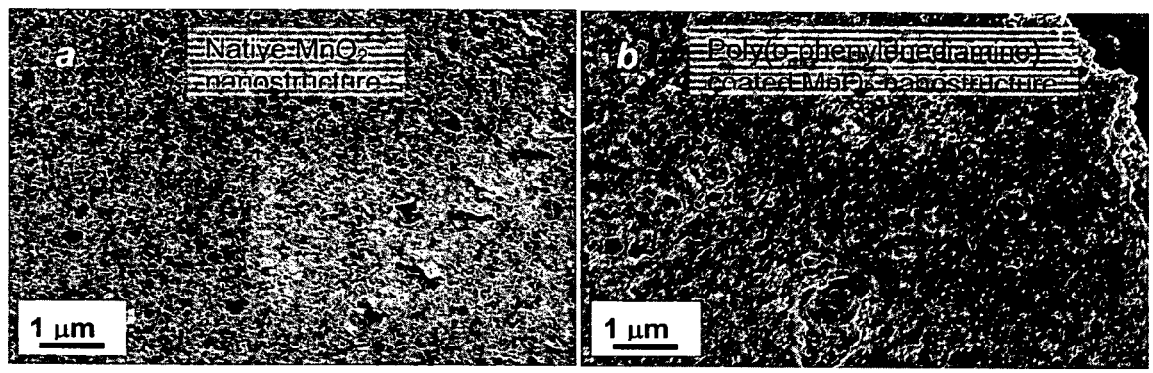
FIG. 1 shows scanning electron micrographs for (a) native, uncoated $MnO_2$ ambigel film electrode, and (b) PPD-coated $MnO_2$ ambigel film electrode.

As-prepared films of mesoporous $MnO_2$ are initially subjected to an electrochemical oxidation in 0.2 M $Na_2SO_4$ (pH 9 borate buffer) electrolyte to lower the solid-state concentration of Mn(III) centers in the mesoporous oxide nanoarchitecture. The electrodes are then transferred to a second electrolyte containing ~10 mM of the arylamine monomer in a basic electrolyte of 0.2 M $Na_2SO_4$ (pH 9 borate buffer). Polymerization of the monomer can be initiated using a number of electrochemical techniques including voltammetric, potentiostatic, galvanostatic, potential-pulse, and current-pulse methods. The electrochemical oxidation of OPD monomers to form poly(o-phenylenediamine) (PPD) commences at a potential of approximately +0.44 V vs. the normal hydrogen electrode. Regardless of the electrochemical method employed, the growth of the PPD coating is self-limited due to the exceptionally poor electronic conductivity and minimal swelling of the developing polymer. The film thickness of PPD films at planar electrodes is typically less than 10 nm, and more typically 7-9 nm. By applying the polymer coating under self-limiting conditions, the mesoporous oxide structure can be exhaustively coated without filling in the mesopore network (see FIG. 1). Polymer-coated $MnO_2$ films are further subjected to heating at 150° C. in a vacuum oven for 12 hours to improve the stability of the hybrid structure. Numerous other electropolymerizable monomers are candidates to form self-limited, conformal polymeric films on high-surface-area charge-insertion oxide nanoarchitectures.

Figure 3:
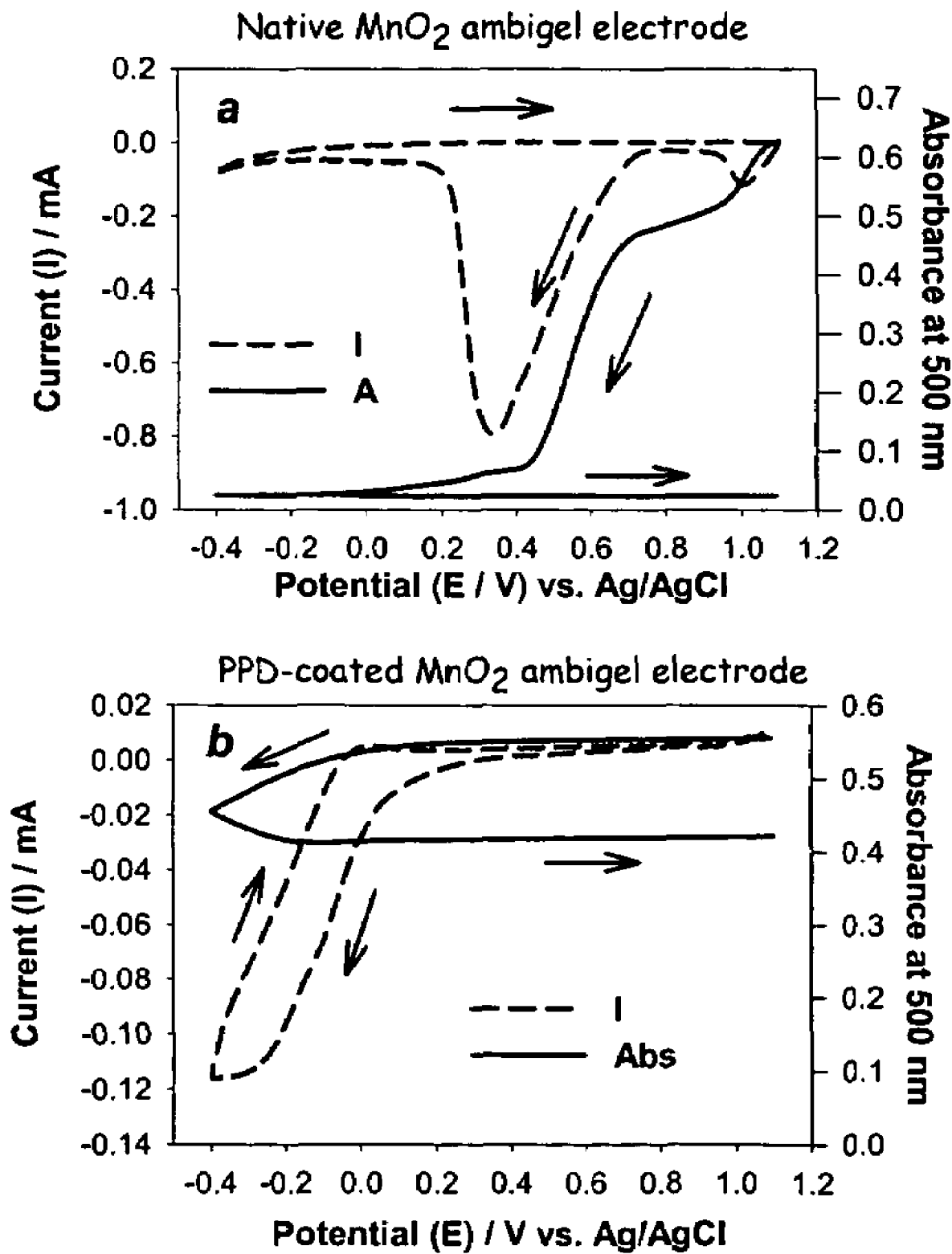
FIG. 3 shows cyclic voltammograms for (a) native $MnO_2$ ambigel film, and (b) PPD-coated $MnO_2$ ambigel film in 0.1 M $H_2SO_4$ and the absorbance of the $MnO_2$ film at 500 nm simultaneously recorded during the voltammetric scan. In the case of the native $MnO_2$ film, electrochemical reduction is irreversible as indicated by the absence of current peaks on the reverse voltammetric scan. The absorbance at 500 nm also tracks the total dissolution of the $MnO_2$ film on the first reduction sweep. For the PPD-coated $MnO_2$ film, no electrochemical dissolution occurs at the expected potentials. The reduction current at E<0 V and the accompanying loss in absorbance is attributed to proton insertion at the underlying $MnO_2$, controlled by the redox reactions of the PPD polymer coating.

The polymer-coated $MnO_2$ mesoporous electrodes are then electrochemically analyzed in 0.1 M $H_2SO_4$ electrolyte using voltammetry coupled with simultaneous spectroscopic measurements, which track changes in the electronic state of both the $MnO_2$ and conducting polymer as a function of potential and state-of-charge. Uncoated $MnO_2$ electrodes exhibit an irreversible dissolution process during the reduction cycle (see FIG. 3a), and are thus not good candidates for charge storage in acid electrolytes. When mesoporous manganese oxide electrodes that have been electrochemically coated with PPD are subjected to cycling in acid, no features characteristic of dissolution are observed (see FIG. 3b). The highly porous, nanoscopic, high-surface-area oxide architecture is remarkably stabilized to acid-induced dissolution by the ultrathin electrodeposited polymer.

Figure 2:
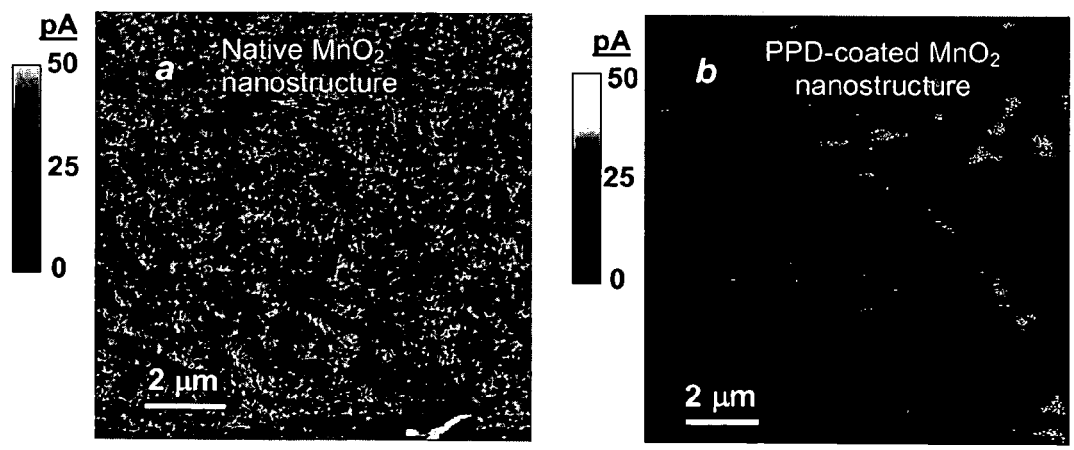
FIG. 2 shows Conducting-mode atomic force microscopy images for (a) a native, uncoated $MnO_2$ ambigel film electrode, and (b) a PPD-coated $MnO_2$ ambigel film electrode. For the native, uncoated $MnO_2$ film the measured conductivity (tunneling current) coincides with the $MnO_2$ solid domains of the porous electrode. In the case of the PPD-coated $MnO_2$ electrode no measurable tunneling currents are found and no imaging is possible. This inability to image is indicative of the highly insulating nature of the PPD polymer coating, and the complete coverage of the high-surface-area $MnO_2$ electrode by this polymer.
Figure 4:
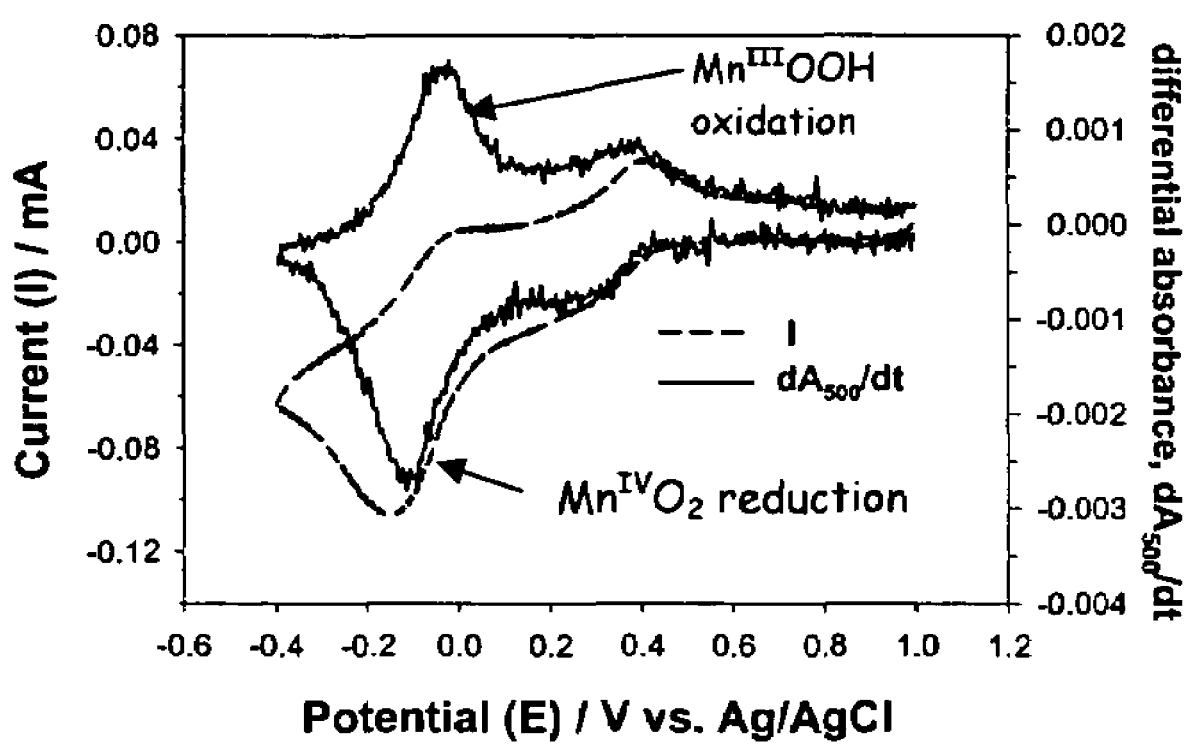
FIG. 4 shows a cyclic voltammogram for a POMA-coated $MnO_2$ ambigel film in 0.1 M $H_2SO_4$ and the differential absorbance $(dA_{500}/dt)$ of the POMA-coated $MnO_2$ film at 500 nm simultaneously recorded during the voltammetric scan. The differential absorbance provides a direct measure of the $MnO_2$ electronic state during the voltammetric measurement. This result demonstrates the underlying $MnO_2$ can be reversibly reduced and re-oxidized beneath the polymer coating, which is contacting an acid electrolyte.

These acid-stable organic-inorganic hybrids exhibit electrochemical activity in the potential range of +0.4 V to −0.4 V. The electrochemical and spectroscopic responses can be ascribed to electronic-state changes of both the polymer coating and the underlying $MnO_2$. Although these polymer coatings are insulating (see FIG. 2b) under the basic electrolyte conditions from which they are electrodeposited, when transferred to acidic electrolytes these polymers are electro-active and behave like more conventional conducting polymers. The reversibility for proton-insertion in the encapsulated $MnO_2$ domains is dictated by the redox potential of the polymer coating. Polymers, such as poly(aniline) (PANI) and poly(o-methoxyaniline) (POMA), have redox potentials overlapping those of $MnO_2$. Reversible proton-insertion in acid electrolytes is observed for $MnO_2$ electrodes protected with ultrathin POMA coatings (see FIG. 4).

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g. using the articles "a," "an," "the," or "said" is not construed as limiting the element to the singular.

What is claimed is:

1. A device for use in energy storage comprising:
   (a) a composite electrode structure comprising a nanostructured electrically conductive substrate of porous carbon interpenetrated by a continuous mesoporous network and coated with a metal oxide; and
   (b) an ultrathin conformal polymer coating on said metal oxide;
   wherein said composite electrode structure has a mesoporous structure and said metal oxide retains said mesoporous network.

2. The device of claim 1 wherein said metal oxide is selected from the group consisting of manganese oxides, vanadium oxides, nickel oxides, iron oxides, and physical or compositional mixtures thereof.

3. The device of claim 1 wherein said polymer coating is based on an aryl monomer that can be electrochemically oxidized under self-limiting conditions.

4. The device of claim 1 wherein said polymer coating is selected from the group consisting of o-phenylenediamine, aniline, and mixtures thereof.

5. The device of claim 1 wherein said composite electrode structure has a porous architecture and wherein said polymer coating is deposited electrochemically in a self-limiting fashion on said metal oxide such that said metal oxide architecture retains said porosity.

6. The device of claim 1 wherein said polymer coating is less than 10-nm thick.

7. A method for making a device for use in energy storage, comprising the steps of:
   (a) preparing a composite electrode structure comprising a nanostructured electrically conductive substrate of porous carbon interpenetrated by a continuous mesoporous network and coated with a metal oxide; and
   (b) depositing a polymer coating on said metal oxide;
   wherein said composite electrode structure has a mesoporous structure and said metal oxide retains said mesoporous network.

8. The method of claim 7 wherein said metal oxide is selected from the group consisting of manganese oxides, vanadium oxides, nickel oxides, iron oxides, and physical or compositional mixtures thereof.

9. The method of claim 7 wherein said polymer coating is based on an arylamine monomer.

10. The method of claim 7 wherein said polymer coating is selected from the group consisting of o-phenylenediamine, aniline, and mixtures thereof.

11. The method of claim 7 wherein said composite electrode structure has a porous architecture and wherein said polymer coating is deposited electrochemically in a self-limiting fashion on said metal oxide such that said metal oxide architecture retains said porosity.

12. The method of claim 7 wherein said polymer coating is less than 10-nm thick.

13. An electrode for use in energy storage comprising:
   (a) a nanostructured electrically conductive substrate of porous carbon interpenetrated by a continuous mesoporous network and a metal oxide coating; and
   (b) an ultrathin conformal polymer coating on said metal oxide
   wherein said ultrathin conformal polymer coating is less than 10-nm thick.

14. The electrode of claim 13 wherein said metal oxide coating retains said mesoporous network.

15. The electrode of claim 13 wherein said metal oxide coating is selected from the group consisting of manganese oxides, vanadium oxides, nickel oxides, iron oxides, and physical or compositional mixtures thereof.

16. The electrode of claim 13 wherein said polymer coating is selected from the group consisting of o-phenylenediamine, aryl monomer, aniline, and mixtures thereof and wherein said polymer coating can be electrochemically oxidized under self-limiting conditions.

* * * * *

UNITED STATES PATENT AND TRADEMARK OFFICE
CERTIFICATE OF CORRECTION

PATENT NO. : 7,651,819 B2  Page 1 of 1
APPLICATION NO. : 11/589729
DATED : January 26, 2010
INVENTOR(S) : Long et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this

Twenty-third Day of November, 2010

David J. Kappos
*Director of the United States Patent and Trademark Office*